US012771991B2

(12) United States Patent
Yue

(10) Patent No.: US 12,771,991 B2
(45) Date of Patent: Oct. 20, 2026

(54) SPEAKER BOX STRUCTURE AND ELECTRONIC DEVICE

(71) Applicants: GUANGZHOU SHIYUAN ELECTRONIC TECHNOLOGY COMPANY LIMITED, Guangzhou (CN); GUANGZHOU SHIYUAN ARTIFICIAL INTELLIGENCE INNOVATION RESEARCH INSTITUTE CO., LTD., Guangzhou (CN)

(72) Inventor: Weiyong Yue, Guangzhou (CN)

(73) Assignees: GUANGZHOU SHIYUAN ELECTRONIC TECHNOLOGY COMPANY LIMITED, Guangzhou (CN); GUANGZHOU SHIYUAN ARTIFICIAL INTELLIGENCE INNOVATION RESEARCH INSTITUTE CO., LTD., Guangzhou (CN)

( * ) Notice: Subject to any disclaimer, the term of this patent is extended or adjusted under 35 U.S.C. 154(b) by 188 days.

(21) Appl. No.: 18/755,631

(22) Filed: Jun. 26, 2024

(65) Prior Publication Data

US 2024/0348975 A1 Oct. 17, 2024

Related U.S. Application Data

(63) Continuation of application No. PCT/CN2023/106907, filed on Jul. 12, 2023.

(30) Foreign Application Priority Data

Jul. 28, 2022 (CN) ........................ 202221973238.9

(51) Int. Cl.

| | |
|---|---|
| ***H04R 1/24*** | (2006.01) |
| ***H04R 1/02*** | (2006.01) |
| ***H04R 1/34*** | (2006.01) |

(52) U.S. Cl.

CPC ............ *H04R 1/345* (2013.01); *H04R 1/025* (2013.01); *H04R 1/24* (2013.01)

(58) Field of Classification Search

CPC ........... H04R 1/345; H04R 1/025; H04R 1/24

See application file for complete search history.

(56) References Cited

U.S. PATENT DOCUMENTS 4,923,031 A * 5/1990 Carlson .................. H04R 1/403 181/150

2004/0131217 A1* 7/2004 Opie ...................... H04R 1/345 381/337

(Continued)

FOREIGN PATENT DOCUMENTS

CN 207968920 U 10/2018

CN 210137410 U 3/2020

(Continued)

OTHER PUBLICATIONS

European Search Report issued in European application No. 23845317.9, mailed Sep. 30, 2025, 9 pages.

(Continued)

*Primary Examiner* — Suhan Ni

(74) *Attorney, Agent, or Firm* — BAYES PLLC

(57) ABSTRACT

The present disclosure provides a speaker box structure and an electronic device. The speaker box structure includes a speaker box housing, a sound guiding member, a high-pitched speaker, and a mid-bass speaker. The sound guiding member is installed on the speaker box housing, and the sound guiding member forms a high-pitched sound guiding channel and a mid-bass sound guiding channel at intervals. Both the high-pitched sound guiding channel and the mid- (Continued)

bass sound guiding channel have a sound inlet facing the speaker box housing and a sound outlet facing away from the speaker box housing. The high-pitched speaker is disposed on the speaker box housing and is opposite to the sound inlet of the high-pitched sound guiding channel, and the mid-bass speaker is disposed on the speaker box housing and is opposite to the sound inlet of the mid-bass sound guiding channel.

16 Claims, 4 Drawing Sheets

(56) References Cited

U.S. PATENT DOCUMENTS

2007/0258617 A1* 11/2007 Henry ..................... H04R 9/06 381/423
2011/0186705 A1 8/2011 Ke
2015/0172795 A1* 6/2015 Roberts .................... H04R 1/00 381/98
2016/0212523 A1* 7/2016 Spillmann ................ H04R 1/30
2022/0210548 A1 6/2022 Zheng et al.

FOREIGN PATENT DOCUMENTS

CN 215682558 U 1/2022
CN 218387772 U 1/2023

OTHER PUBLICATIONS

International Search Report issued in corresponding international application No. PCT/CN2023/106907, mailed Oct. 25, 2023, 16 pages.

* cited by examiner

SPEAKER BOX STRUCTURE AND ELECTRONIC DEVICE

CROSS-REFERENCE TO RELATED APPLICATION

The present disclosure is a continuation of International Application No. PCT/CN2023/106907, filed on Jul. 12, 2023, which claims priority to a Chinese patent application with the Application No. 202221973238.9, titled "SPEAKER BOX STRUCTURE AND ELECTRONIC DEVICE" and filed on Jul. 28, 2022. The entire contents of the above applications are incorporated in the present disclosure by reference.

TECHNICAL FIELD

The present disclosure relates to the technology field of speakers, and in particular to a speaker box structure and an electronic device.

TECHNICAL BACKGROUND

Some electronic devices on the market today are made very thin in order to have a good-looking appearance. Correspondingly, ultra-thin speaker box structures are also required. Currently, in order to match the overall appearance, this type of speaker box structure is equipped with a single or two full-range speakers of the same specifications inside the speaker, and then a sound guiding structure or horn is added in front of the speaker to guide the sound out. However, after the full-range speaker is reflected by the sound guiding structure or horn, the high frequency will have large losses, which will lead to poor overall sound effects. In order to have better high-frequency sound effects, the vibration quality of the speakers can only be made lighter, but this will also cause a certain loss in the low frequencies. In order to improve the low-frequency sound quality, currently it only can be improved by adjusting and increasing DSP, but when the DSP is adjusted too high, excessive distortion will be caused.

Therefore, it is necessary to design a speaker box structure with better high-pitched and bass effects.

SUMMARY

The purpose of the present disclosure is to provide a speaker box structure and an electronic device, so as to solve the shortcomings and deficiencies in the related art.

According to the present disclosure, a speaker box structure includes: a speaker box housing, a sound guiding member, a high-pitched speaker and a mid-bass speaker.

The sound guiding member is installed on the speaker box housing. The sound guiding member forms a high-pitched sound guiding channel and a mid-bass sound guiding channel at intervals, and both the high-pitched sound guiding channel and the mid-bass sound guiding channel have a sound inlet facing the speaker box housing and a sound outlet facing away from the speaker box housing.

The high-pitched speaker is disposed on the speaker box housing and is opposite to the sound inlet of the high-pitched sound guiding channel, and the mid-bass speaker is disposed on the speaker box housing and is opposite to the sound inlet of the mid-bass sound guiding channel.

Compared with the relating technology, according to embodiments of the present disclosure, the speaker box structure respectively emits sounds of different frequencies by arranging the high-pitched speaker and the mid-bass speaker, and guides and transmits separately the high-frequency and mid-low frequency sounds by arranging high-pitched sound guiding channel and mid-bass sound guiding channel in the sound guiding member. The two sounds are constrained by their different sound guiding channels, which can better guide and transmit the sounds. It not only effectively improves the sound effect, but also achieves the emission of full-range sounds. According to embodiments of the present disclosure, the speaker box structure has better high-pitched and bass effects without additional adjustments, and has a simple overall structure. The guide and transmission of sounds is concentrated on a sound guiding member, which makes installation and use more convenient.

In an embodiment, there are two mid-bass sound guiding channels, and the two mid-bass sound guiding channels are symmetrically arranged on both sides of the high-pitched sound guiding channel.

In an embodiment, there are two high-pitched sound guiding channels, and the two high-pitched sound guiding channels are symmetrically arranged on both sides of the mid-bass sound guiding channel.

In an embodiment, the mid-bass sound guiding channel includes a plurality of shunt partition bars therein, and the plurality of shunt partition bars are arranged at intervals to separate the mid-bass sound guiding channel into multiple branch channels.

In an embodiment, the sound guiding member includes a first sound guiding housing and a second sound guiding housing that are connected to each other. The first sound guiding housing and the second sound guiding housing collectively surround and form the high-pitched sound guiding channel and the mid-bass speaker guiding channel.

In an embodiment, the sound guiding member includes a clamping groove at the sound inlet of the high-pitched sound guiding channel for clamping and fixing the high-pitched speaker.

In an embodiment, the high-pitched speakers are disposed on the speaker box housing at intervals.

In an embodiment, the speaker box housing includes an installation groove for embedding the mid-bass speaker.

In an embodiment, two opposite ends of the speaker box housing are provided with rubber ring fixing parts, and rubber rings are fixed on the rubber ring fixing parts.

According to the present disclosure, an electronic device includes the speaker box structure as described above.

For better understanding and implementation, the present disclosure will be described in detail below in conjunction with the accompanying drawings.

Figure 1:
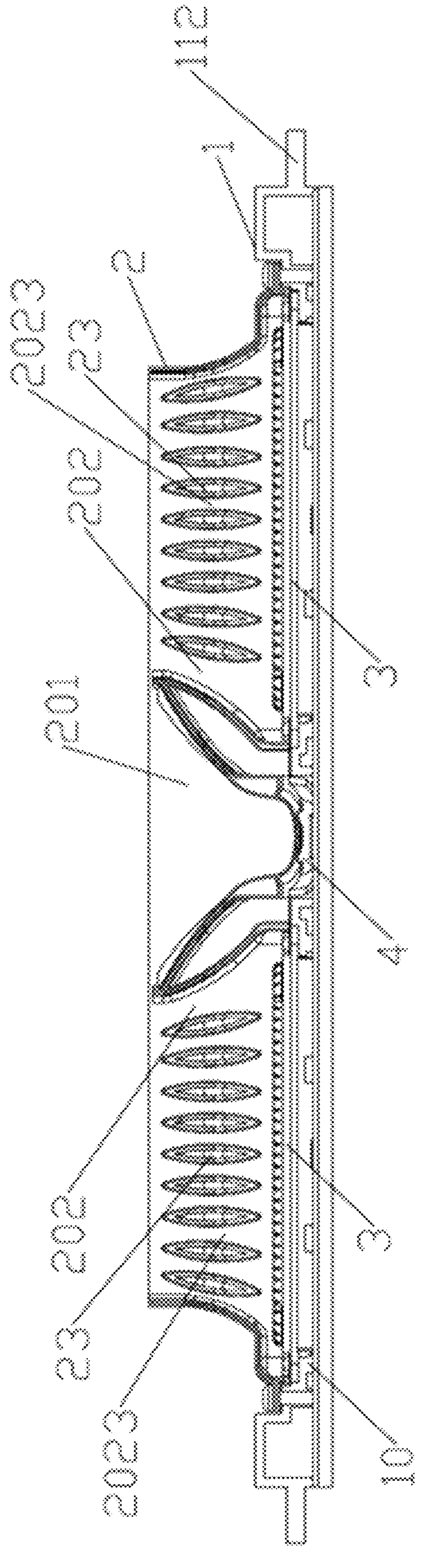
FIG. 1 is a cross-sectional view of the speaker box structure according to an embodiment of the present disclosure.
Figure 2:
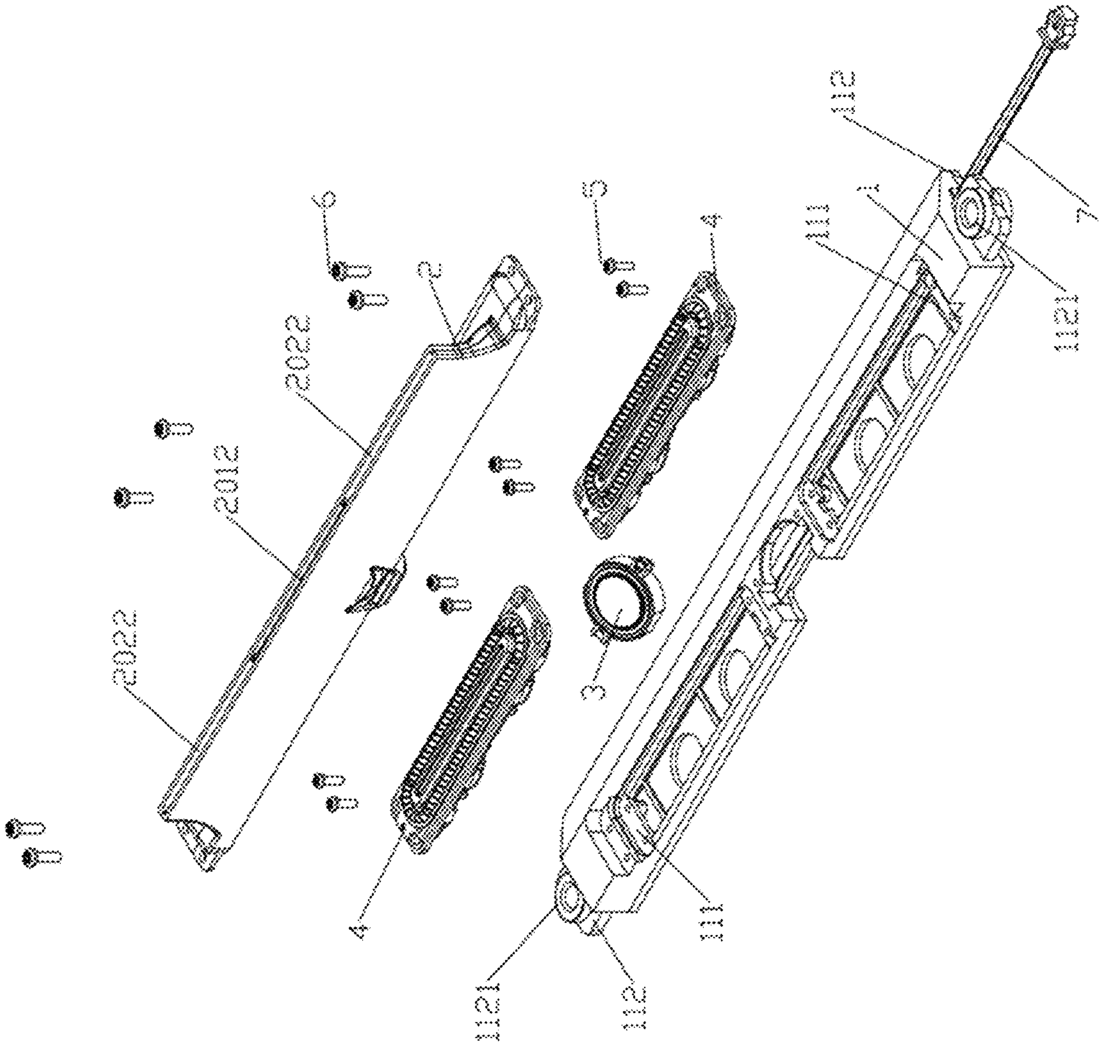
FIG. 2 is a structural schematic diagram of a partially disassembled speaker box structure according to an embodiment of the present disclosure.

1. Speaker box housing; 11. Upper housing; 111. Installation groove; 112. Rubber ring fixing part; 1121. Rubber ring; 12. Lower housing; 10. Sound cavity; 2. Sound guiding member; 21. First sound guiding housing; 22. Second sound guiding housing; 23. Shunt partition bar; 201. high-pitched sound guiding channel; 2011. Sound inlet; 2012. Sound outlet; 202. Mid-bass sound guiding channel; 2021. Sound inlet; 2022. Sound outlet; 2023. Branch channel; 24. Clamping groove; 3. High-pitched speaker; 4. Mid-bass speaker; 5. Screw spike; 6, Screw; 7. Wire.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, rather than all of the embodiments. Based on the embodiments in the present disclosure, all other embodiments obtained by those skilled in the art without creative efforts fall within the claimed scope of the present disclosure.

It should be understood that in the description of the present disclosure, the orientations or positional relationships indicated by the terms "center," "upper," "lower," "front," "back," "left," "right," "vertical," "horizontal," "top," "bottom," "inner," "outside," etc. are based on the orientations or positional relationships shown in the drawings. They are only for the convenience of describing the present disclosure and simplifying the description, and not indicating or implying that the devices or elements referred to must have a specific orientation, be constructed and operated in a specific orientation, and therefore they should not be construed as limiting the present disclosure. The terms "first" and "second" are only used for descriptive purposes and cannot be understood as indicating or implying relative importance or implicitly indicating the number of indicated technical features. That is, the characteristics limited by the terms "first" and "second" may explicitly or implicitly include one or more of these characteristics. Furthermore, unless otherwise stated, "plurality" means two or more.

It should be noted that in the description of the present disclosure, unless otherwise clearly stated and limited, the terms "arrange," "link," "connect," and "hollow" should be understood in a broad sense. For example, it may be a fixed connection, a detachable connection or an integral connection. It may be a mechanical connection or an electrical connection. It can be a direct connection or an indirect connection through an intermediate medium. It can be an internal connection between two components. For those skilled in the art, the specific meanings of the above terms in the present disclosure may be understood based on specific circumstances.

Referring to FIGS. 1 to 4, an embodiment of the present disclosure provides a speaker box structure, which may be applied to a variety of electronic devices, such as interactive display screens. According to this embodiment, the speaker box structure includes: a speaker box housing 1, a sound guiding member 2, a high-pitched speaker 3, and a mid-bass speaker 4.

The sound guiding member 2 is installed on the speaker box housing 1. The sound guiding member 2 forms a high-pitched sound guiding channel 201 and a mid-bass sound guiding channel 202 at intervals. The high-pitched sound guiding channel 201 has a sound inlet facing the speaker box housing 1 and a sound outlet 2012 facing away from the speaker box housing 1. Similarly, the mid-bass sound guiding channel 202 has a sound inlet 2021 facing the speaker box housing 1 and a sound outlet 2021 facing away from the speaker box housing 1. The sound inlet 2011 of the high-pitched sound guiding channel 201 and the sound inlet 2021 of the mid-bass sound guiding channel 202 are located at the same end of the sound guiding member 2. The sound outlet 2012 of the high-pitched sound guiding channel 201 and the sound outlet 2022 of the mid-bass sound guiding channel 202 are also located at the same end of the sound guiding member 2.

The high-pitched speaker 3 is disposed on the speaker box housing 1 and is opposite to the sound inlet 2011 of the high-pitched sound guiding channel 201. The high-frequency sound emitted by the high-pitched speaker 3 may pass through the sound inlet 2011 of the high-pitched sound guiding channel 201 and emits from its sound outlet 2012 after being guided through the high-pitched sound guiding channel 201.

The mid-bass speaker 4 is disposed on the speaker box housing 1 and is opposite to the sound inlet 2021 of the mid-bass sound guiding channel 202. The mid-low frequency sound emitted by the mid-bass speaker 4 may pass through the sound inlet 2021 of the mid-bass sound guiding channel 202, and emits from its sound outlet 2022 after being guided through the mid-bass sound guiding channel 2022.

It can be seen from the above technical solution that, according to the embodiment of the present disclosure, the speaker box structure respectively emits sounds of different frequencies by arranging the high-pitched speaker 3 and the mid-bass speaker 4, and guides and transmits separately the high-frequency and mid-low frequency sounds by arranging the high-pitched sound guiding channel 201 and the mid-bass sound guiding channel 202 in the sound guiding member 2. The two sounds are constrained by their different sound guiding channels, which can better guide and transmit the sounds. It not only effectively improves the sound effect, but also achieves the emission of full-range sounds. According to the embodiment of the present disclosure, the speaker box structure has better high-pitched and bass effects without additional adjustments, and has a simple overall structure. The guide and transmission of sounds is concentrated on a sound guiding member 2, which makes installation and use more convenient.

It should be noted that there are two wiring and sound separation methods for the high-pitched speaker 3 and the mid-bass speaker 4.

A first type, the high-pitched speaker 3 and the mid-bass speaker 4 may be connected to the wire 7 separately. The wire 7 is led out and connected to an external electronic crossover. The external electronic crossover transmits signals of different frequencies to the high-pitched speaker 3 and the mid-bass speaker 4 respectively, thereby realizing the emission of sounds. A second type, by installing an audio crossover inside the speaker box housing 1, the high-pitched speaker 3 and the mid-bass speaker 4 are connected to the audio crossover, thereby realizing the emission of sounds of different frequencies.

It should be noted that the number of high-pitched sound guiding channels 201 and mid-bass sound guiding channels 202 may be adjusted according to actual needs, as long as the number of high-pitched speaker 3 and high-pitched sound guiding channels 201 is in one-to-one correspondence, and the number of mid-bass speakers 4 and mid-bass guiding channels 202 is in one-to-one correspondence.

In order to achieve a better bass effect, preferably, in this embodiment, two mid-bass sound guiding channels 202 are provided, and the two mid-bass sound guiding channels 202 are symmetrically arranged on both sides of the high-pitched sound guiding channel 201, thereby obtaining better bass sound quality. Definitely, in order to make the high-pitched effect better, in some other embodiments, there are two high-pitched sound guiding channels 201, and the two high-pitched sound guiding channels 201 are symmetrically arranged on both sides of the mid-bass sound guiding channel 202 (not shown in the figures), thereby obtaining better high-pitched sound effect.

Figure 3:
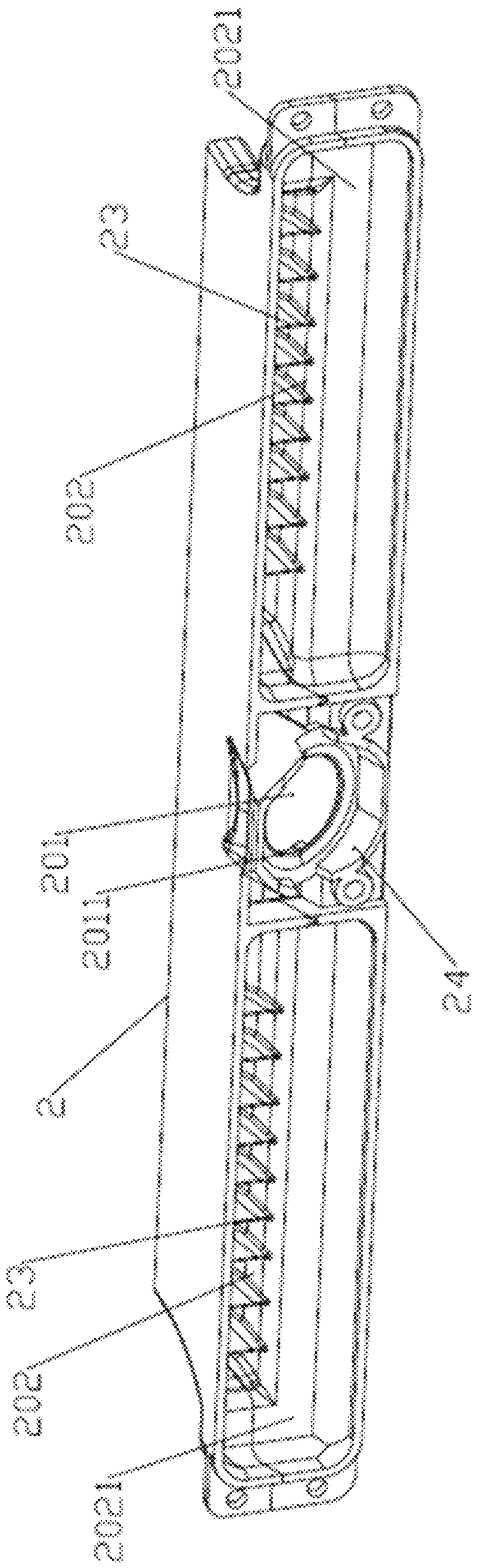
FIG. 3 is a structural schematic diagram of a sound guiding member from one perspective according to an embodiment of the present disclosure.
Figure 4:
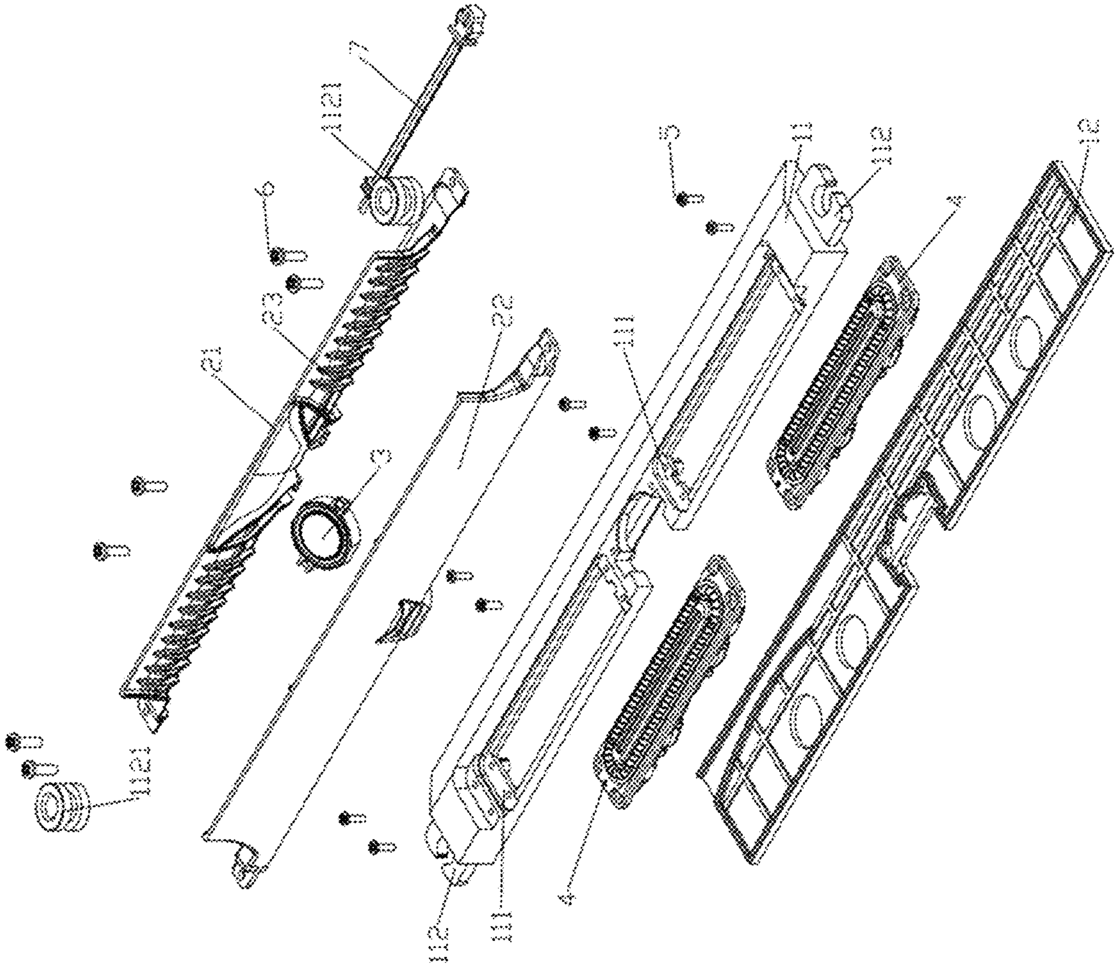
FIG. 4 is a schematic diagram of a completely disassembled speaker box structure according to an embodiment of the present disclosure.

As shown in FIGS. 1, 3, and 4, in this embodiment, a plurality of shunt partition bars 23 are provided in the mid-bass sound guiding channel 202, and the plurality of shunt partition bars 23 are arranged at intervals in sequence to separate the mid-bass sound guiding channel 202 to multiple branch channels 2023. The mid-bass-frequency and low-frequency sounds are output to the sound outlet 2022 through multiple branch channels 2023. The sounds are isolated from each other, which can effectively avoid sound interference in the horizontal and left directions, making the output bass sound better. Specifically, the shunt partition bar 23 extends along the direction from the sound inlet 2021 to the sound outlet 2022 of the mid-bass sound guiding channel 202.

The sound guiding member 2 may be integrally formed, but in order to facilitate production and reduce manufacturing costs, the sound guiding member 2 according to this embodiment includes a first sound guiding housing 21 and a second sound guiding housing 22 that are connected to each other. The first sound guiding housing 21 and the second sound guiding housing 22 collectively surround and form a high-pitched sound guiding channel 201 and a mid-bass sound guiding channel 202.

In order to facilitate the assembly of the overall speaker box structure, the sound guiding member 2 according to this embodiment includes a clamping groove 24 at the sound inlet 2011 of the high-pitched sound guiding channel 201. The high-pitched speaker 3 is clamped and fixed in the clamping groove 24, and the high-pitched speaker 3 is disposed on the speaker box housing 1 at intervals, that is, there is a certain gap between the high-pitched speaker 3 and the speaker box housing 1, so that the heat dissipation effect of the high-pitched speaker 3 can be improved.

In one embodiment, the speaker box housing 1 of this embodiment includes an installation groove 111, and the mid-bass speaker 4 is embedded in the installation groove 111, which can effectively improve the air tightness of the mid-bass speaker 4 and facilitate the installation of the mid-bass speaker 4. The mid-bass speaker speaker 4 is fixed to the speaker box housing 1 through fasteners, and the fasteners are screws 5 in this embodiment.

In one embodiment, the opposite ends of the speaker box housing 1 are provided with rubber ring fixing parts 112, and a rubber ring 1121 is fixed on the rubber ring fixing part 112. The rubber ring 1121 is used to fix with the external structure, so as to realize the installation of the speaker box structure. During installation, a threaded part may be used to pass through the rubber ring 1121 and then be locked to the threaded hole of the external structure, so as to realize the installation of the speaker box structure.

Specifically, the speaker box housing 1 according to this embodiment includes an upper housing 11 and a lower housing 12. The upper housing 11 and the lower housing 12 are installed in cooperation with each other, and surround and form a sound cavity 10. The installation groove 111 and the rubber ring fixing part 112 are both arranged on the upper housing 11. The mid-bass speaker 4 is embedded in the installation groove 111 and then placed in the sound cavity 10, which can improve the bass effect. The sound guiding member 2 and the upper housing 11 of the speaker box housing 1 are installed with each other. During installation, the sound guiding member 2 covers the mid-bass speaker 4 so that the mid-bass speaker 4 is opposite to the sound inlet 2021 of the mid-bass sound guiding channel 202, the sound guiding member 2 and the upper housing 11 of the speaker box housing 1 may be connected through screws 6.

According to the embodiment of the present disclosure, the speaker box structure may be assembled through the following steps:

S1: Assembling the lower housing 12 and the upper housing 11 together to form the speaker box housing 1.

S2: Installing the rubber ring 1121 on the rubber ring fixing part 112, and installing the wire 7 into the speaker box housing 1.

S3: Embedding the mid-bass speaker 4 in the installation groove 111 and locking the screws 5.

S4: Bonding and assembling the first sound guide housing 21 and the second sound guide housing 22 together through ultrasonic or glue bonding to form the sound guiding member 2.

S5: Installing the high-pitched speaker 3 into the clamping groove 24, so that it is opposite to the sound inlet 2011 of the high-pitched sound guiding channel 201.

S6: Covering the sound guiding member 2 on the upper housing 11 of the speaker box housing 1, so that the mid-bass speaker 4 faces the sound inlet 2021 of the mid-bass sound guiding channel 202, and locking the screws 6.

According to an embodiment of the present disclosure, an electronic device is further provided, which includes a speaker box structure as described above. The electronic device may be an interactive display screen. The electronic device using the speaker box structure has better high-pitched and bass effects without additional adjustment, and the overall structure is simple. The guide and transmission of sounds is concentrated on one sound guide, making it more convenient to install and use.

The above-described embodiments only express several implementation modes of the present disclosure, and their descriptions are relatively specific and detailed, but they should not be construed as limiting the scope of the utility model patent. It should be noted that, for those skilled in the art, several modifications and improvements may be made without departing from the concept of the present disclosure, and these all fall within the claimed scope of the present disclosure.

What is claimed is:

1. A speaker box structure, comprising:

a bar-type speaker box housing;

a sound guiding member;

a high-pitched speaker; and a mid-bass speaker, wherein the sound guiding member is disposed on the bar-type speaker box housing, and the sound guiding member forms a high-pitched sound guiding channel and a mid-bass sound guiding channel at intervals, and both the high-pitched sound guiding channel and the mid-bass sound guiding channel have a sound inlet facing the bar-type speaker box housing and a sound outlet facing away from the bar-type speaker box housing; and the high-pitched speaker is disposed on the bar-type speaker box housing and is opposite to the sound inlet of the high-pitched sound guiding channel, and the mid-bass speaker is disposed on the bar-type speaker box housing and is opposite to the sound inlet of the mid-bass sound guiding channel, wherein the mid-bass sound guiding channel comprises a strip-slot profile.

2. The speaker box structure of claim 1, wherein a number of mid-bass sound guiding channels is two, and the two mid-bass sound guiding channels are symmetrically arranged on both sides of the high-pitched sound guiding channel.

3. The speaker box structure of claim 2, wherein a number of mid-bass sound speakers is two, and the two mid-bass sound speakers are symmetrically arranged on both sides of the high-pitched sound speaker and in parallel with each other.

4. The speaker box structure of claim 1, wherein a number of the high-pitched sound guiding channels is two, and the two high-pitched sound guiding channels are symmetrically arranged on both sides of the mid-bass sound guiding channel.

5. The speaker box structure of claim 1, wherein a plurality of shunt partition bars are disposed within the mid-bass sound guiding channel, and the plurality of shunt partition bars are arranged at intervals to separate the mid-bass sound guiding channel into multiple branch channels.

6. The speaker box structure of claim 1, wherein the sound guiding member comprises a first sound guiding housing and a second sound guiding housing that are connected to each other and collectively surround and form the high-pitched sound guiding channel and the mid-bass speaker guiding channel.

7. The speaker box structure of claim 1, wherein the sound guiding member comprises a clamping groove at the sound inlet of the high-pitched sound guiding channel for clamping and fixing the high-pitched speaker.

8. The speaker box structure of claim 7, wherein the high-pitched speakers are disposed on the bar-type speaker box housing at intervals.

9. The speaker box structure of claim 1, wherein the bar-type speaker box housing includes an installation groove for embedding the mid-bass speaker, wherein a shape of the installation groove is complementary to a contour of the mid-bass speaker.

10. The speaker box structure of claim 1, wherein two opposite ends of the bar-type speaker box housing are provided with rubber ring fixing parts, and the rubber ring fixing parts are fixed with rubber rings.

11. The speaker box structure of claim 1, wherein the sound guiding member comprises a continuous curvilinear profile.

12. The speaker box structure of claim 1, wherein the high-pitched sound guiding channel comprises a smoothly streamlined surface.

13. The speaker box structure of claim 1, wherein the high-pitched speaker and the mid-bass speaker are connected to a wire by which signals of different frequencies are transmitted to the high-pitched speaker and the mid-bass speaker respectively.

14. The speaker box structure of claim 13, wherein the wire is connected to an external electronic crossover.

15. The speaker box structure of claim 1, wherein the high-pitched speaker and the mid-bass speaker are connected to an audio crossover provided within the bar-type speaker box housing.

16. An electronic device, comprising a speaker box structure, wherein the speaker box structure comprises:

a bar-type speaker box housing;

a sound guiding member;

a high-pitched speaker; and a mid-bass speaker, wherein the sound guiding member is disposed on the bar-type speaker box housing, and the sound guiding member forms a high-pitched sound guiding channel and a mid-bass sound guiding channel at intervals, and both the high-pitched sound guiding channel and the mid-bass sound guiding channel have a sound inlet facing the bar-type speaker box housing and a sound outlet facing away from the bar-type speaker box housing; and the high-pitched speaker is disposed on the bar-type speaker box housing and is opposite to the sound inlet of the high-pitched sound guiding channel, and the mid-bass speaker is disposed on the bar-type speaker box housing and is opposite to the sound inlet of the mid-bass sound guiding channel, wherein the mid-bass sound guiding channel comprises a strip-slot profile.

* * * * *